Patented Dec. 17, 1929

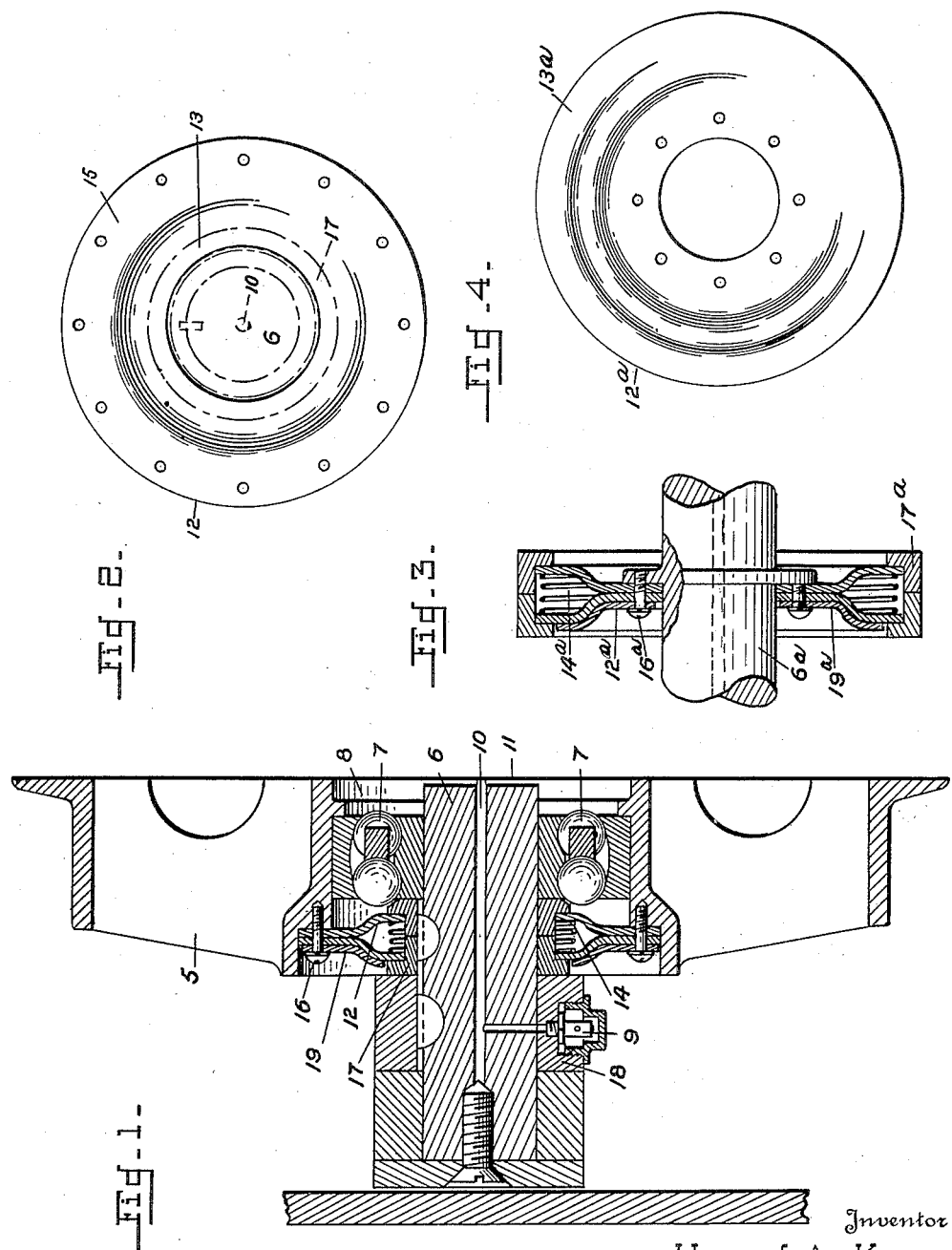

1,740,428

UNITED STATES PATENT OFFICE

HARRY A. KNOX, OF DAVENPORT, IOWA

PACKING UNIT

Application filed January 13, 1926. Serial No. 81,078.

(GRANTED UNDER THE ACT OF MARCH 3, 1883, AS AMENDED APRIL 30, 1928; 370 O. G. 757)

The invention described herein, if patented, may be manufactured and used by or for the Government for governmental purposes without the payment to me of any royalty thereon.

The subject of this invention is a packing unit.

Considerable difficulty has heretofore been experienced in confining a lubricant to a rotating member such as an axle or wheel bearing and this is especially true, where, under severe conditions of usage the packing must also serve to prevent the incursion of foreign matter.

The principal object of the present invention is to provide a simple and efficient packing unit which will permit of ready application.

To these and other ends, my invention consists in the construction, arrangement, and combination of elements, described hereinafter and pointed out in the claim forming a part of this specification.

A practical embodiment of the invention is illustrated in the accompanying drawing, wherein:

Fig. 1 is a longitudinal sectional view through a member equipped with my improved packing unit;

Fig. 2 is a detail view of one of the offset disks;

Fig. 3 shows a different arrangement of the disks; and

Fig. 4 is a detail view of one of the disks shown in Fig. 3.

Referring to the drawings by numerals of reference:

The packing unit embodied in this invention is shown applied to a roller 5 such as is used in supporting a vehicle of the track laying type.

The roller is mounted on a dead axle 6 by means of ball bearings 7 only one of which is shown and lubricant may be introduced into the spaces 8 between the roller bearings by means of the fitting 9 and the passages 10 and 11. The packing unit employed to confine the lubricant consists of a pair of offset disks 12 encircling the axle and formed of any suitable material such as leather. These members are reversely mated so that their inner marginal portions 13 will be spaced to accommodate a spreading member, specifically a spring 14, while their outer portions 15 will abut against each other to be conveniently held to the wheel by means of screws 16. The inner marginal portions are packed against recessed supporting rings 17—17, keyed on the axle between the bearing and a hub ring 18. While the remaining portion of both disks may be supported I prefer to only back the outer ring with a correspondingly shaped offset plate 19 which is secured to the wheel by means of the screws 16 which retain the disk.

Inasmuch as the spring 14 will permit inward movement of the disks the space between the disks will become packed either with grease or mud or both which will thus supplement the action of the spring in holding the disks tight against their supporting rings and will seal the packing with a pressure in excess of the pressure of the confined lubricant.

In those constructions wherein the axle is the rotatable member the offset disks will be aranged as shown in Figs. 3 and 4 wherein $6^a$ is the rotatable member or shaft, $12^a$ are the offset disks, $13^a$ are the spaced portions of the disks, $14^a$ is the spreading member or spring, $16^a$ are the screws for fastening the disks to the rotatable member, $17^a$ are the supporting rings and $19^a$ is the offset plate for supporting an outermost offset disk.

I claim:

A packing unit for rotatable members including a pair of offset flexible disks reversely mated to provide contacting and spaced portions, means passing through the contacting portions for securing the disks to the rotatable member, fixed members for supporting the ends of the spaced portions of the disks, a spring for holding such ends against their supporting members and an offset rigid annular plate secured to the rotatable member and engageably supporting the portion of the outer disk not supported by the fixed member.

HARRY A. KNOX.